United States Patent
Sreedhar et al.

(10) Patent No.: US 11,368,486 B2
(45) Date of Patent: Jun. 21, 2022

(54) DETERMINING A RISK PROBABILITY OF A URL USING MACHINE LEARNING OF URL SEGMENTS

(71) Applicant: Fortinet, Inc., Sunnyvale, CA (US)

(72) Inventors: Rajiv Sreedhar, Sunnyvale, CA (US); Ratinder Paul Singh Ahuja, Saratoga, CA (US); Manuel Nedbal, Santa Clara, CA (US); Toshal Phene, Santa Clara, CA (US); Jitendra Gaitonde, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 585 days.

(21) Appl. No.: 16/299,893

(22) Filed: Mar. 12, 2019

(65) Prior Publication Data
US 2020/0296134 A1    Sep. 17, 2020

(51) Int. Cl.
*H04L 9/40* (2022.01)
*G06F 16/955* (2019.01)
*G06N 7/00* (2006.01)

(52) U.S. Cl.
CPC .......... *H04L 63/20* (2013.01); *G06F 16/9566* (2019.01); *G06N 7/005* (2013.01)

(58) Field of Classification Search
CPC ...... H04L 63/20; G06F 16/9566; G06N 7/005
See application file for complete search history.

(56) References Cited

U.S. PATENT DOCUMENTS

| | | | | |
|---|---|---|---|---|
| 8,136,025 | B1 * | 3/2012 | Zhu | G06F 16/951 |
| | | | | 707/637 |
| 10,275,589 | B1 * | 4/2019 | Mossoba | G06F 21/35 |
| 2010/0242111 | A1 * | 9/2010 | Kraemer | G06F 21/552 |
| | | | | 726/22 |
| 2012/0126940 | A1 * | 5/2012 | Coggill | G06F 21/36 |
| | | | | 340/5.54 |
| 2014/0214788 | A1 * | 7/2014 | Koutrika | G06F 40/237 |
| | | | | 707/708 |

(Continued)

FOREIGN PATENT DOCUMENTS

| | | | | |
|---|---|---|---|---|
| CN | 108111489 A | * | 6/2018 | ......... G06F 16/9566 |
| KR | 20200071477 A | * | 6/2020 | ......... G06Q 30/0255 |
| WO | WO-2020026318 A1 | * | 2/2020 | ............. G06K 9/629 |

OTHER PUBLICATIONS

Zhang, A novel Anomaly Detection Approach for Mitigating Web-based Attacks against Clouds, 2015, IEEE, pp. 1-6 (Year: 2015 ).*

*Primary Examiner* — Arvin Eskandarnia
(74) *Attorney, Agent, or Firm* — HDC Intellectual Property Law, LLP

(57) ABSTRACT

Systems, methods, and apparatuses enable a machine learning model to determine a risk probability of a URL. A query configurator receives a URL in a query and normalizes the URL. The normalized URL is segmented into a plurality of segments. The plurality of segments is serially provided to the machine learning model trained to provide an indication of risk associated with the URL. The indication of risk associated with the URL can be a probability value based on one or more risk probabilities determined for segment-segment transitions of the URL. A security service compares the probability value of the URL to a threshold value and performs a security action based on a result of comparing the probability value to the threshold value.

20 Claims, 17 Drawing Sheets

(56) References Cited

U.S. PATENT DOCUMENTS

| | | | | |
|---|---|---|---|---|
| 2019/0236488 A1* | 8/2019 | Achan | | H04L 67/26 |
| 2020/0161002 A1* | 5/2020 | Oishi | | G16H 50/70 |
| 2020/0195667 A1* | 6/2020 | Li | | H04L 63/1433 |
| 2020/0274894 A1* | 8/2020 | Argoeti | | H04L 63/1408 |
| 2020/0374313 A1* | 11/2020 | Manoselvam | | H04L 63/1483 |

* cited by examiner

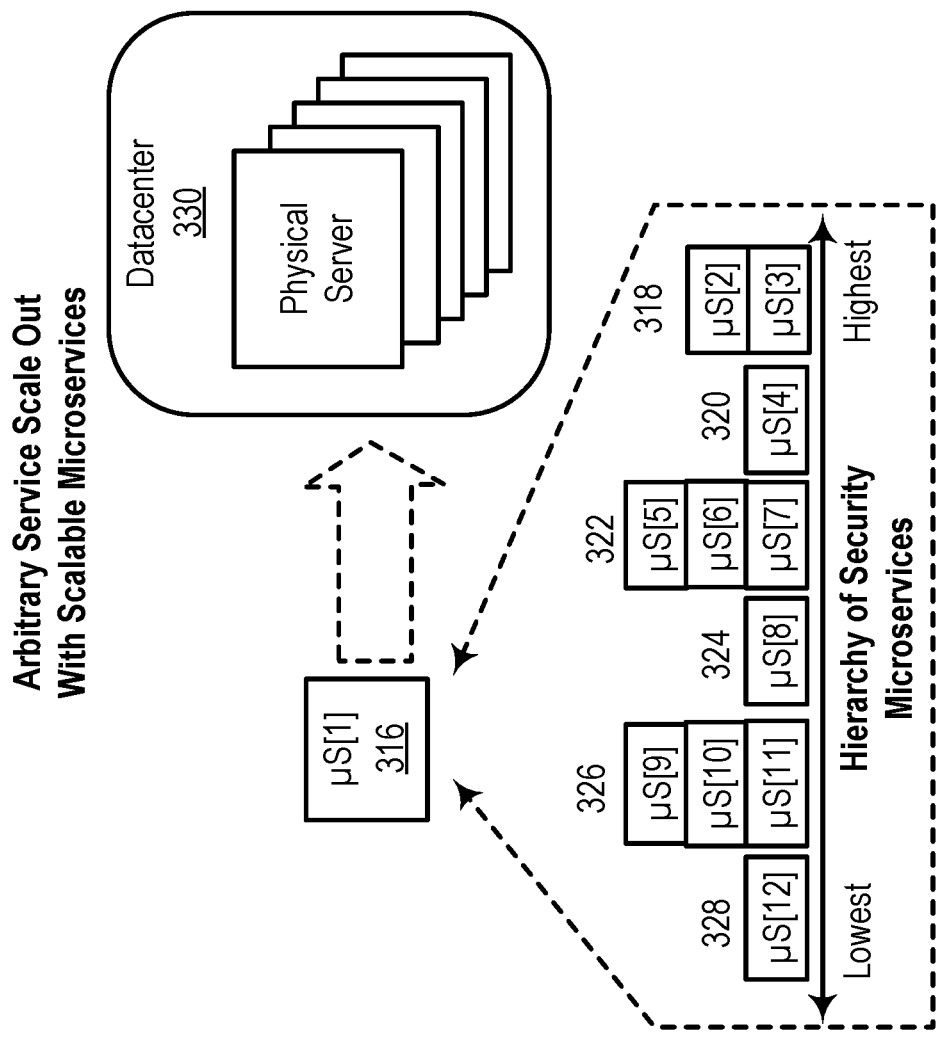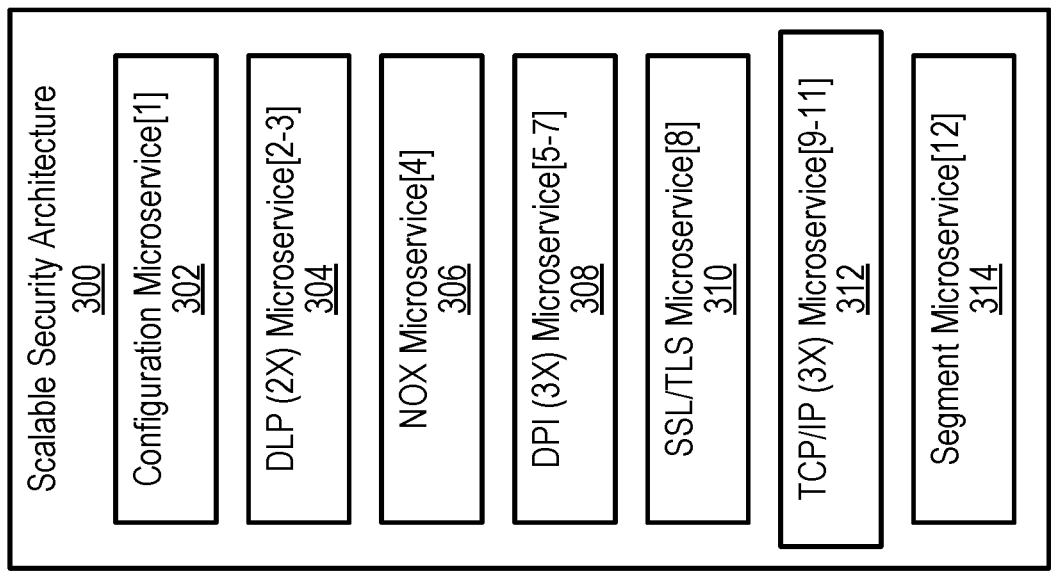
FIG. 3

```
0001  import numpy as np
0002  import keras
0003  from numpy import array
0004  from pickle import dump
0005  from keras.utils import np_utils
0006  from keras.models import Sequential
0007  from keras.layers import Dense
0008  from keras.layers import LSTM
0009  from os import listdir
0010  from os.path import isfile,join
0011  import sys
0012  from pickle import load
0013
0014  mypath = '/home/spark/url_test/temp/temp/temp_files/'
0015  onlyfiles = [f for f in listdir(mypath) if isfile(join(mypath, f))]
0016
0017  mapping = load(open('mapping.pkl','rb'))
0018  mapping[' ']=77
0019  window_size = 10
0020  vocab_size = len(mapping)
0021
0022  model = Sequential()
0023  model.add(LSTM(20,input_shape=(window_size,len(mapping))))
0024  model.add(Dense(vocab_size, activation='softmax'))
0025  model.compile(loss='categorical_crossentropy', optimizer='adam', metrics=['accuracy'])
0026
0027  for i,f in enumerate(onlyfiles):
0028      filename = mypath + f
0029
0030      f = open(filename,encoding = 'ISO-8859-1')
0031      raw_text = f.read()
0032      length = 10
0033      sequences = []
0034
0035      for i in range(length, len(raw_text)):
0036          seq = raw_text[i-length:i+1]
0037          sequences.append(seq)
0038
0039      chars = sorted(list(set(raw_text)))
0040      mapping = dict((c,i) for i,c in enumerate(chars))
```

FIG. 10A

```
0041
0042        lines = sequences[:]
0043        sequences = []
0044        for line in lines:
0045            encoded_seq = []
0046            for char in line:
0047                if(char in mapping):
0048                    encoded_seq.append(mapping[char])
0049                else:
0050                    encoded_seq.append(77)
0051            sequences.append(encoded_seq)
0052
0053        vocab_size = len(mapping)
0054
0055        sequences = array(sequences)
0056        X, y = sequences[:,:-1], sequences[:,-1]
0057
0058        sequences = [np_utils.to_categorical(x,vocab_size) for x in X]
0059        X = array(sequences)
0060        y = np_utils.to_categorical(y,vocab_size)
0061
0062        model.fit(X, y, nb_epoch=100, verbose=2)
0063
0064        model.save('temp/temp/temp_models/model.h5')
0065        model.save_weights('temp/temp/temp_models/model_save')
0066        file1 = open('temp/temp/temp_models/model.json','w')
0067        js = model.to_json()
0068        file1.write(js)
0069        file1.close()
0070
0071        dump(mapping, open('model/mapping.pkl', 'wb'))
```

FIG. 10B

```
0001  from keras.models import load_model
0002  from keras.utils import to_categorical
0003  from keras.preprocessing.sequence import pad_sequences
0004  from pickle import load
0005
0006  def generate_seq(model, mapping, seq_length, seed_text, n_chars):
0007      in_text = seed_text
0008      for _ in range(n_chars):
0009          encoded = [mapping[char] for char in in_text]
0010          encoded = pad_sequences([encoded], maxlen=seq_length, truncating='pre')
0011          encoded = to_categorical(encoded, num_classes=len(mapping))
0012          encoded = encoded.reshape(1,10,89)
0013          yhat = model.predict_classes(encoded, verbose=0)
0014          out_char = ''
0015          for char, index in mapping.items():
0016              if index == yhat:
0017                  out_char = char
0018                  break
0019          in_text += char
0020      return in_text
0021
0022  model = load_model('../model/model.h5')
0023  mapping = load(open('../mapping/mapping.pkl', 'rb'))
0024
0025  def get_score(u):
0026      sc = 0
0027      l = len(u)
0028      for i in range(len(u)-1):
0029          ip = u[:i+1]
0030          try:
0031              pred = generate_seq(model,mapping,10,ip,1)[-1]
0032          except:
0033              pred = ''
0034          finally:
0035              if(pred == u[i+1]):
0036                  sc+=1
0037      if(l!=0):
0038          p = sc/l
0039      else:
0040          p=0
0041      return p
```

FIG. 12A

```
0042
0043   def check_score(score,good_threshold,bad_threshold):
0044       if(score<bad_threshold):
0045           return "bad"
0046       elif(score>good_threshold):
0047           return "good"
0048       else:
0049           return "unclassified"
0050
0051   # good url
0052   score = get_score('www.google.com')
0053   print("www.google.com","\t",score,"\t",check_score(score,0.5,0.15))
0054   # bad url
0055   score = get_score('elvyodjjtao.net')
0056   print("elvyodjjtao.net","\t",score,"\t",check_score(score,0.5,0.15))
```

FIG. 12B

DETERMINING A RISK PROBABILITY OF A URL USING MACHINE LEARNING OF URL SEGMENTS

TECHNICAL FIELD

Embodiments described herein generally relate to network security. Embodiments described herein generally relate to systems and methods for determining a risk probability of a URL using machine learning of URL segments.

BACKGROUND INFORMATION

Most businesses and organizations rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

BRIEF DESCRIPTION OF THE DRAWINGS

The various advantages of the embodiments disclosed herein will become apparent to one skilled in the art by reading the following specification and appended claims, and by referencing the drawings, in which:

FIG. 3 illustrates an arbitrary scaling out of a microservice in accordance with the disclosed embodiments;

FIGS. 10A-B is an example script for configuring a URL probability model in accordance with an embodiment;

FIGS. 12A-B is an example script for configuring a URL probability model in accordance with an embodiment;

DETAILED DESCRIPTION

Figure 1:
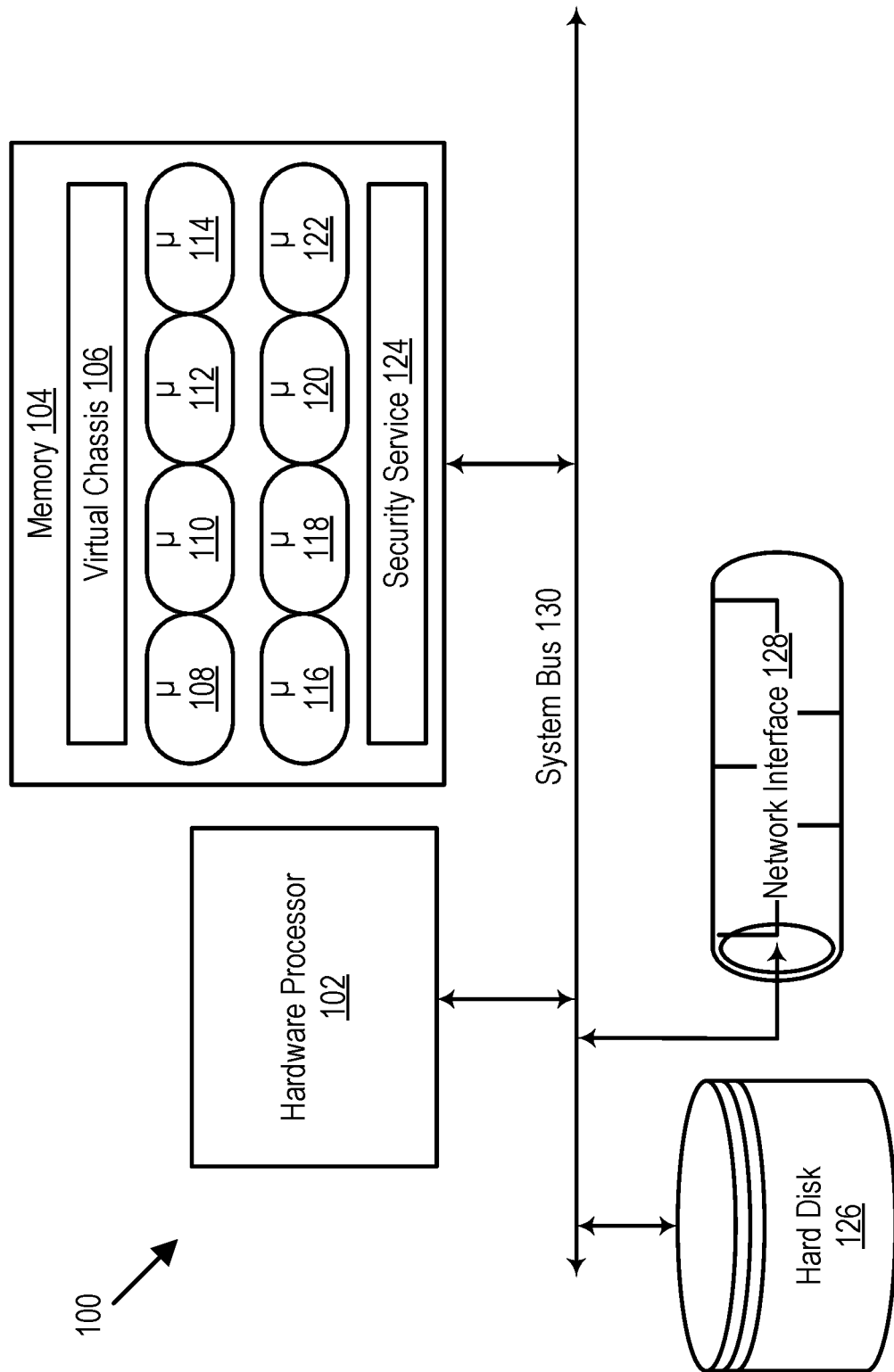
FIG. 1 is a block diagram of a network security system illustrating computer hardware, including a memory and processor, in accordance with the disclosed embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to use a machine learning model to determine a risk probability of a web address, a security system utilizing a plurality of security microservices can be implemented. In conventional systems, risk probability may be associated with reputation, established by a number of means. Reputation may be established by observing a history of transactions with no security events, rating different geographic regions (e.g., via IP geolocation) as inherently having different risk levels or other means including proprietary statistics. Relying on history represents a particular shortcoming as many URLs in current systems may be dynamically generated. In the case of malicious actors, it is common to observe a large number of dynamically generated URLs that are constantly changing to evade block lists or reputation-based filters.

To address the deficiencies of existing security infrastructures, embodiments detailed herein train a machine learning model with an extensive list of established (e.g., presumed safe) URLs in order to allow time-series predictions of the segments within a new candidate URL. The sequence of segments within the training set of URLs allows the machine learning model to determine how closely the sequences of segments in the new candidate URL matches those expected (for each segment-segment transition) based on the model. The risk probability of the new candidate URL can then be assessed based on how well the trained model predicted all the segment-segment transitions with randomly generated URLs expected to show poor prediction. Embodiments detailed herein can advantageously determine the likelihood of a URL being dynamically and/or randomly generated without relying on prior observations of traffic from that URL. Specifically, dynamically and/or randomly generated URLs are expected to contain segment-segment transitions that are not commonly found in the list of established (e.g., non-risky) URLs, and the inability of the trained machine learning model to predict the segment-segment transitions of a new candidate URL is indicative of higher risk. Conversely, legitimate URLs are expected to contain segment-segment transitions more commonly found in the list of established URLs, and the ability of the trained model to predict the segment-segment transitions of a new candidate URL is indicative of lower risk. In one embodiment, the machine learning model uses time-series prediction to predict a future condition (whether a queried URL is risky or non-risky) based on the history of previous conditions (e.g., training URLs) used for training.

For example, some embodiments detailed herein utilize a machine learning model trained to provide an indication of risk associated with a URL to determine a probability value indicating the amount of risk associated with a queried URL. To train the machine learning model, a training configurator retrieves training URLs from a training list. The training configurator normalizes the URL and segments the normalized URL into a plurality of segments. The training configurator serially provides each of the plurality of segments into the machine learning model, and the machine learning model determines an indication of risk associated with each of the plurality of segments or with each segment-segment transition. After the machine learning model is trained, the machine learning model can determine the risk of queried URLs. The queried URL is normalized and segmented prior to being serially provided to the machine learning model. The probability value determined by the machine learning model for the queried URL indicates whether the queried URL is risky or not risky, and can be based on one or more risk probabilities of segments of the queried URL. A security service compares the probability value of the URL to a threshold value and performs a security action based on a result of comparing the probability value to the threshold value.

FIG. 1 is a block diagram of network security system 100 illustrating computer hardware, including a memory (e.g., 104) and processor (e.g., 102), in accordance with the disclosed embodiments. Network security system 100 further includes a hard disk (e.g., 126) and network interface 128. In one embodiment, hardware processor 102, memory 104, hard disk 126, and network interface 128 are coupled to each other via a system bus (e.g., system bus 130). Network security microservices 108-122 are stored in memory 104 (e.g., volatile memory such as Random-Access Memory (RAM) and/or non-volatile memory such as solid-state storage or disk) and executed by one or more processor cores or hardware processor 102. Network security microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, network security system 100 utilizes hardware processor 102 (such as a central processing unit (CPU) or one or more cores thereof, a graphics processing unit (GPU) or one or more cores thereof, or an accelerated processing unit (APU) or one or more cores thereof) to execute microservices and other applications (e.g., virtual chassis 106, security service 124, etc.) stored in memory 104. Network interface 128 (e.g., fabric or interconnect that is wired or wireless) provides a means for communicating with a data center. Network security system 100 may inspect traffic, detect threats, generate security settings and policies (e.g., access control lists), and otherwise protect a data center using the microservices 108-122.

Embodiments of network security system 100 providing the above capabilities are now discussed in more detail. Network security system 100 adds security to, or enhances the security of, a datacenter or other computing environment. In one embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, network security system 100 utilizes a network interface 128 to explore the datacenter and to discover existing network segments, determine security settings and policies to apply to various network segments, detect available hosts and hardware resources, and determine additional configuration information as needed. In one embodiment, the datacenter itself includes several machines with hypervisors, or physical hardware, and the network security system 100 offers microservices to communicate with and protect one or more of those internal virtual machines or physical hardware. Based on performing datacenter discovery, network security system 100, in some embodiments, may then offer or suggest available security tools for selection either through a graphical interface or via connections with existing enterprise management software. In one embodiment, once configured, network security system 100 is deployed "in-line," receiving packets headed for the datacenter, thereby allowing network security system to intercept and block suspicious traffic before it reaches the datacenter. With an understanding of the datacenter, network security system 100 deploys microservices to inspect traffic throughout the datacenter, and not only at ingress. In some embodiments, network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which may also be a microservice. In one embodiment, the microservices are small in size, consisting of a relatively small number of instructions. In one embodiment, the microservices 108-122 are independent of each other. As illustrated, microservices 108-122 are microservices that are loaded from memory and executed by the hardware processor 102. Those microservices 108-122 include data path security microservices, for example TCP/

IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

Memory 104 also stores security service 124. Security service 124 is configured to utilize a plurality of microservices to manage the initialization of other security microservices on a computing device (e.g., servers) to prevent potentially bad or malicious network traffic from being transmitted from an untrusted network (e.g., the internet) to trusted network resources, and between trusted network resources. In one embodiment, security service 124 trains a machine learning model to be able to determine the probability of a risky URL (e.g., malicious content, malware, etc.), and processes queried URLs through the machine learning model to determine whether to perform security actions. In one embodiment, the processes disclosed herein are performed by security service 124. In other embodiments, the processes disclosed herein are performed by microservices (e.g., microservices 108-122) based on instructions from security service 124.

It will be understood by those of ordinary skill in the art that a datacenter typically employs many instances of the hardware represented within network security system 100 such as hardware processor 102 and memory 104. Individual servers may have multiple processors or multiple processing boards each with multiple processors. Processors may have a plurality of processing cores and access a plurality of network interfaces. Security service 124 comprises program code executing within a processor and may have interfaces (such as configuration or administration user interfaces) that are made available over a network to users. In a virtualized environment, the user may not be aware of the specific processor on which security service 124 is executing and, in some embodiments, that processor may change based on loading of the virtual environment. Such changes may occur based on administrator requests or automatically based on the virtual environment's control software.

In one embodiment, network security system 100 receives traffic via network interface 128 to/from a datacenter. In one embodiment, network security system 100 is placed in-line to inspect traffic, and potentially intercept a threat before it arrives at, or leaves, the datacenter. In other embodiments, network security system 100 monitors the traffic heading into, or out of, the datacenter, in which case network security system 100 detects threats and generates alerts but does not block the data. Hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In one embodiment, microservices 108-122 are implemented using computer-executable instructions loaded from the Internet via network interface 128. For instance, in one embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer-readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, network security system 100 runs on a datacenter computer. In other embodiments, however, network security system 100 is installed and runs on any one of a wide variety of computing platforms, ranging from low-cost to high-cost, and from low-power to high power. In some embodiments, network security system 100 runs on a server. In some embodiments, network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs and/or memory are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
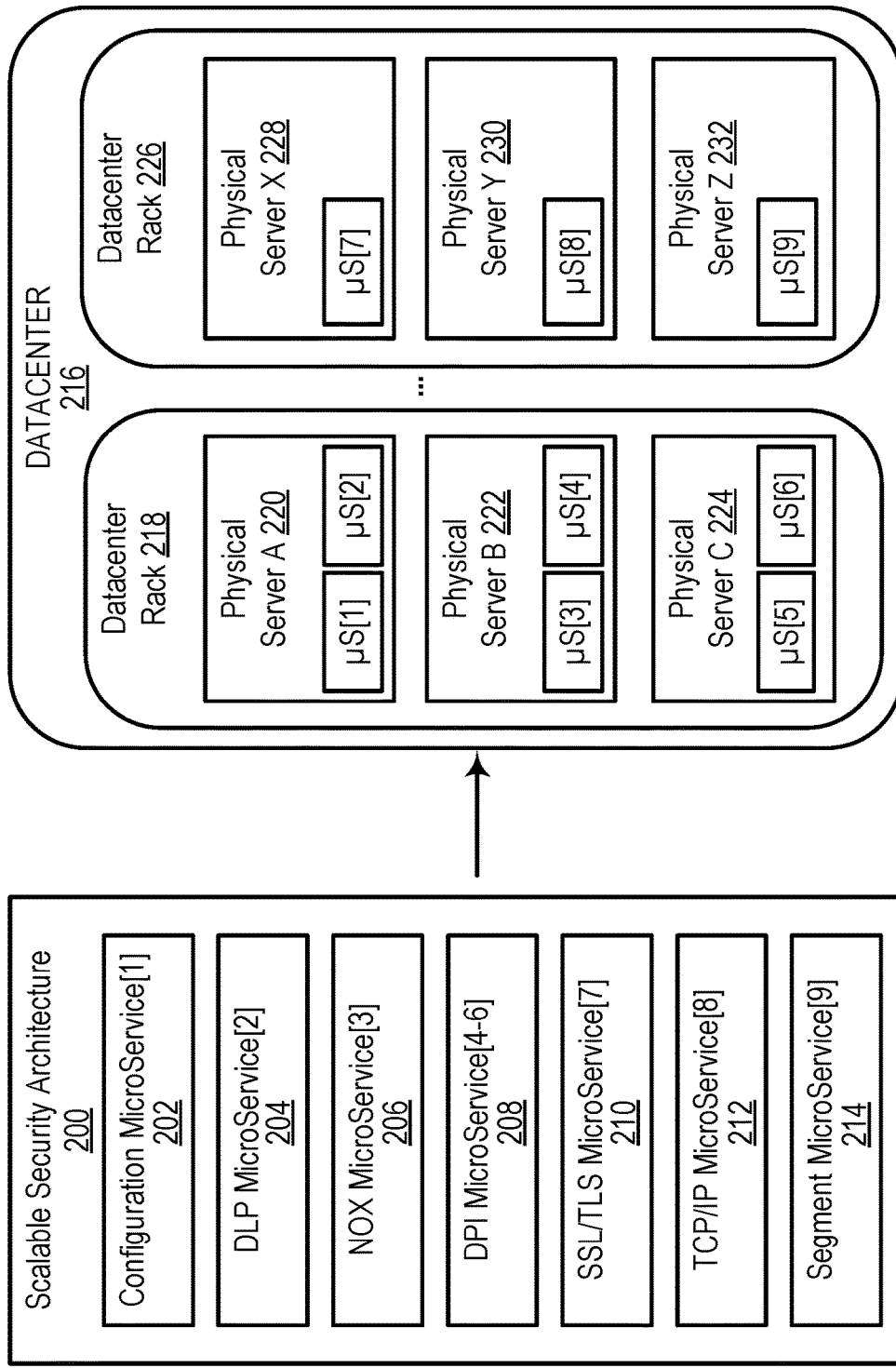
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each level of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3X) microservice 308 (a 3-times scale-out), SSL/TLS microservice 310, TCP/IP (3×) microservice 312 (a 3-times scale-out), and segment microservice 314. As shown, configuration microservice 316 provisions the 11 microservices (318, 320, 322, 324, 326, and 328) from a lowest hierarchy to a highest hierarchy and configures them to communicate with each other via a backplane. The microservices, for example, may be implemented by physical servers in datacenter 330.

Figure 4:
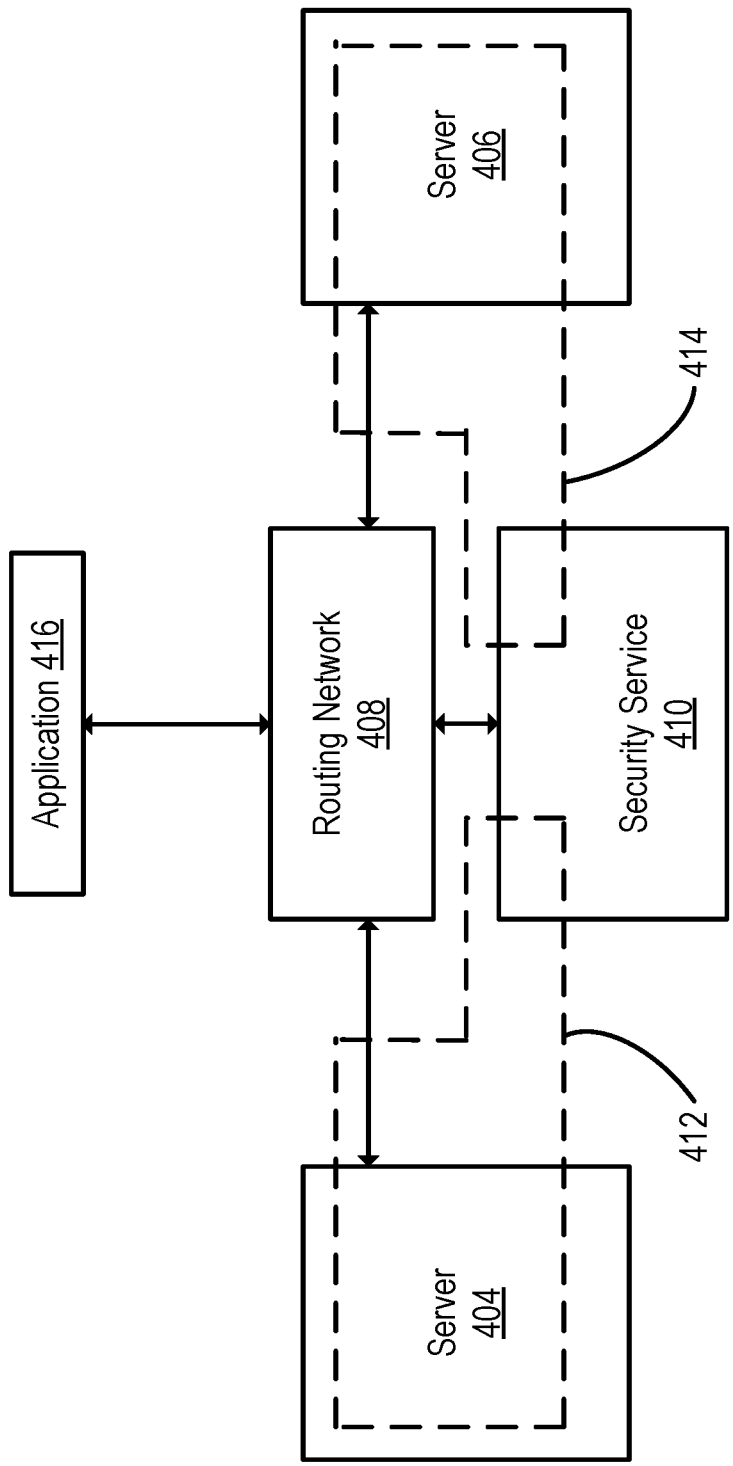
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between application 416 and one or more servers 404 and 406 through a routing network 408. In one embodiment, security service 410 is an example of security service 124 in FIG. 1. In one embodiment, security service 410 comprises one or more "microservices" (e.g., microservices 108-122 in FIG. 1) used to monitor and perform various actions relative to data items (e.g. network traffic, files, email messages, etc.) sent to and received from one or more applications 416 and servers 404 and 406. The microservices comprising security service 410 do not need to be confined to one physical server such as a server 404 and 406. For example, one or more microservices of the security service 410 may be executed on server 404 and other microservices of the security service 410 are executed on 406. In some embodiments, the security service 410 is executed on a different server from one or more servers for which the security service is responsible for monitoring and protecting. In one embodiment, servers 404 and 406, security service 410, and application 416 are deployed in a networked environment. Examples of networked environments include data centers, an on-premise stack, and a set of servers remotely connected using a network.

In one embodiment, a routing network 408 provides connectivity among servers 404 and 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and/or server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
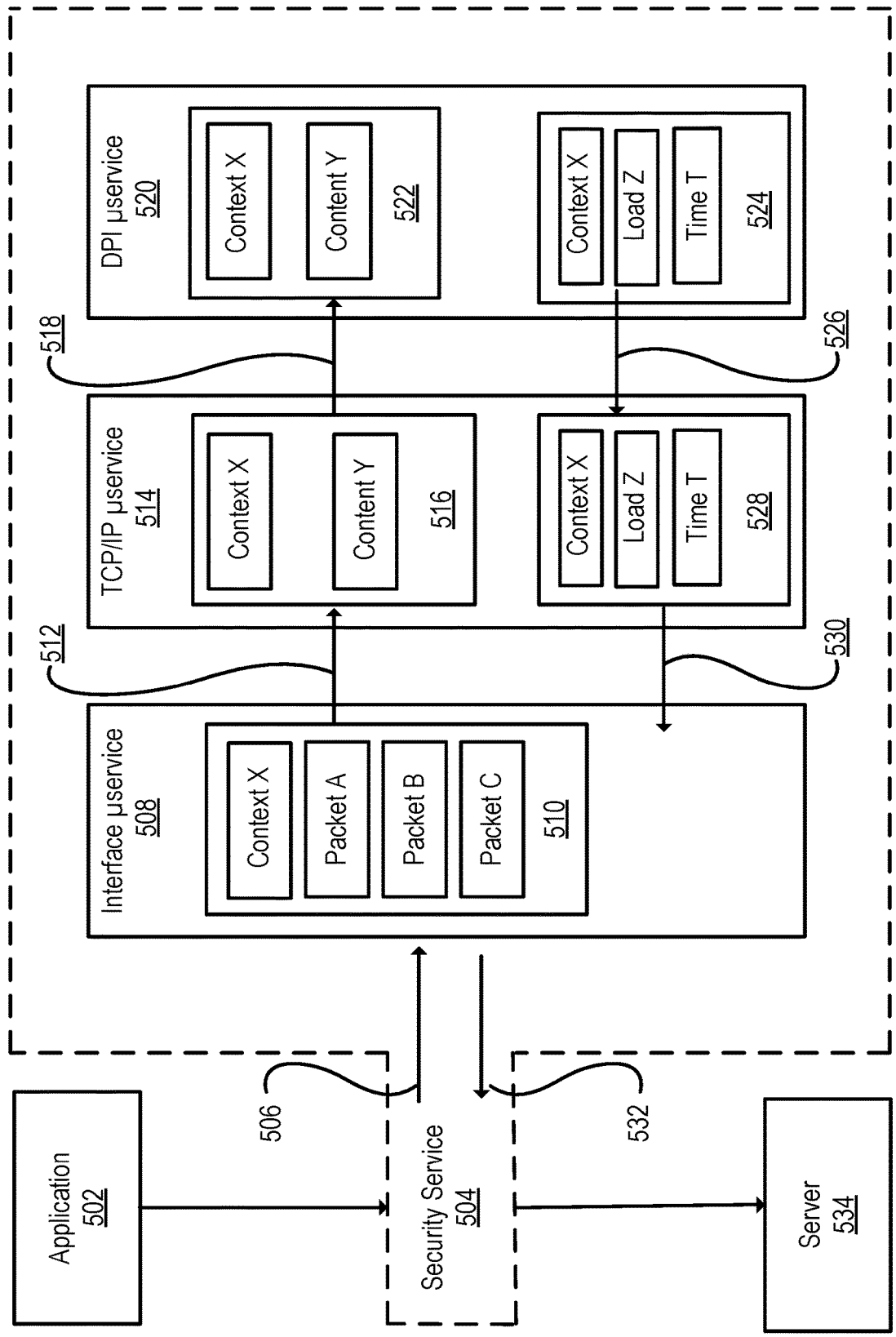
FIG. 5 is a block flow diagram illustrating application data traversing to a server after passing through a hierarchy of security microservices in accordance with the disclosed embodiments.

FIG. 5 is a block flow diagram illustrating application data traversing to a server after passing through a hierarchy of security microservices according to an embodiment. As illustrated, the flow begins with security service 504 receiving a network data packet from application 502. In one embodiment, security service 504 is an example of security service 124 in FIG. 1. Security service 504 receives the packet (e.g., from an application or program that redirects packets to security service 504), and security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service) or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via transmission path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via transmission paths 526 and 530, the microservices receive and can maintain real-time loading and processing latency information utilized to make load balancing decisions.

Figure 6:
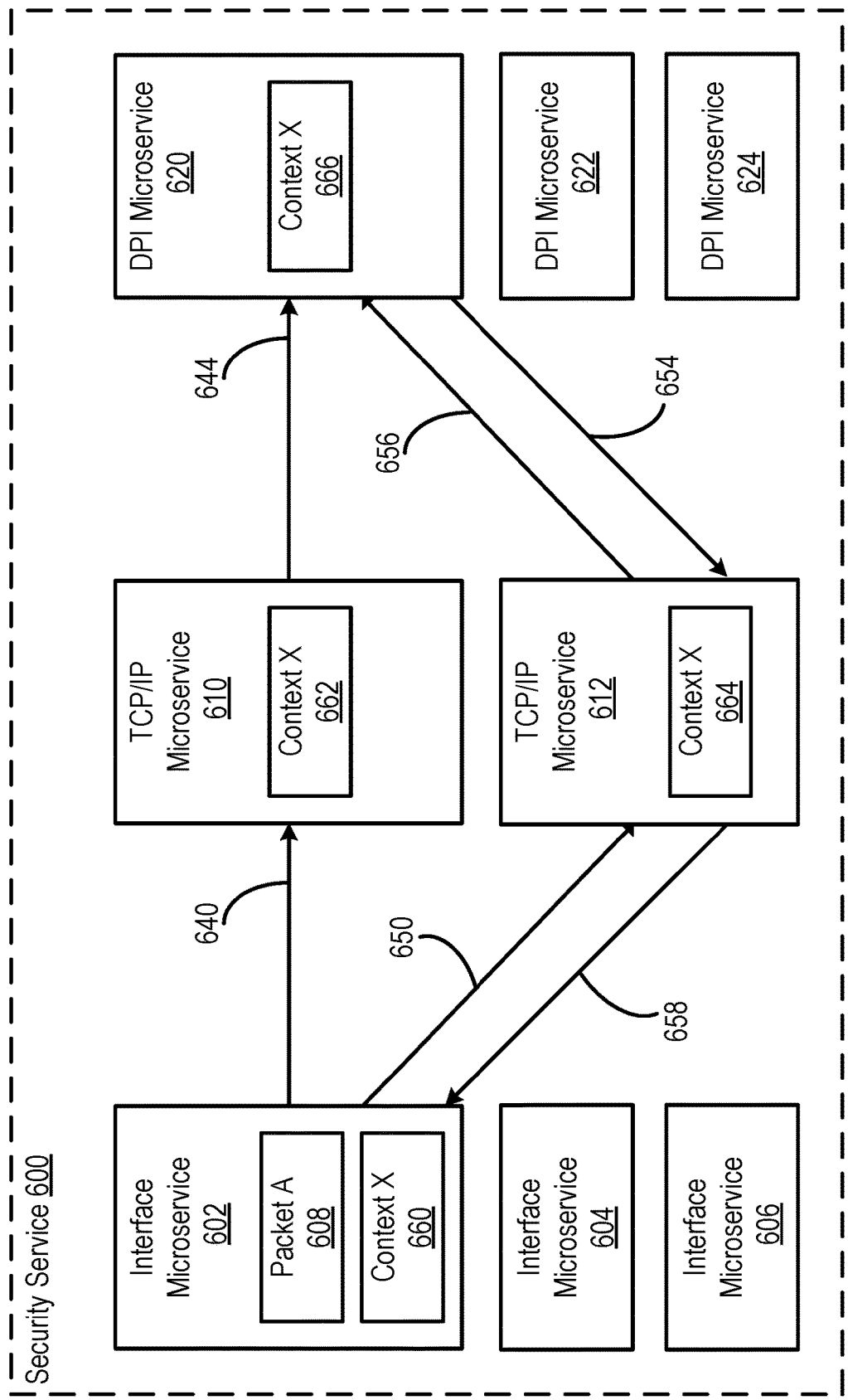
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices and/or a different number of microservice types. In one embodiment, security system 600 is an example of security service 124 in FIG. 1. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission path 640. Context X 662, when transmitted to DPI microservice 620 as part of transmission path 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and a state lookup or a context lookup, in addition to other information. Interface microservice 602 provides packet A 608 and context X 660 to TCP/IP microservice 610 or 612 via transmission paths 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data and/or the data resulting from the security processing to DPI microservice 620 via transmission paths 644 or 656, respectively. Along with the transmitted data, TCP/IP microservice 610 or 612 forwards context X 662 or 664, respectively, to DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via transmission path 650. TCP/IP microservice 612 performs some security processing, then transmits the second packet and context X 664 to DPI microservice 620 via transmission path 656. After performing some security processing, DPI microservice 620 responds to TCP/IP microservice 612 via transmission path 654, and TCP/IP microservice responds to interface microservice 602 via transmission path 658.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

Figure 7:
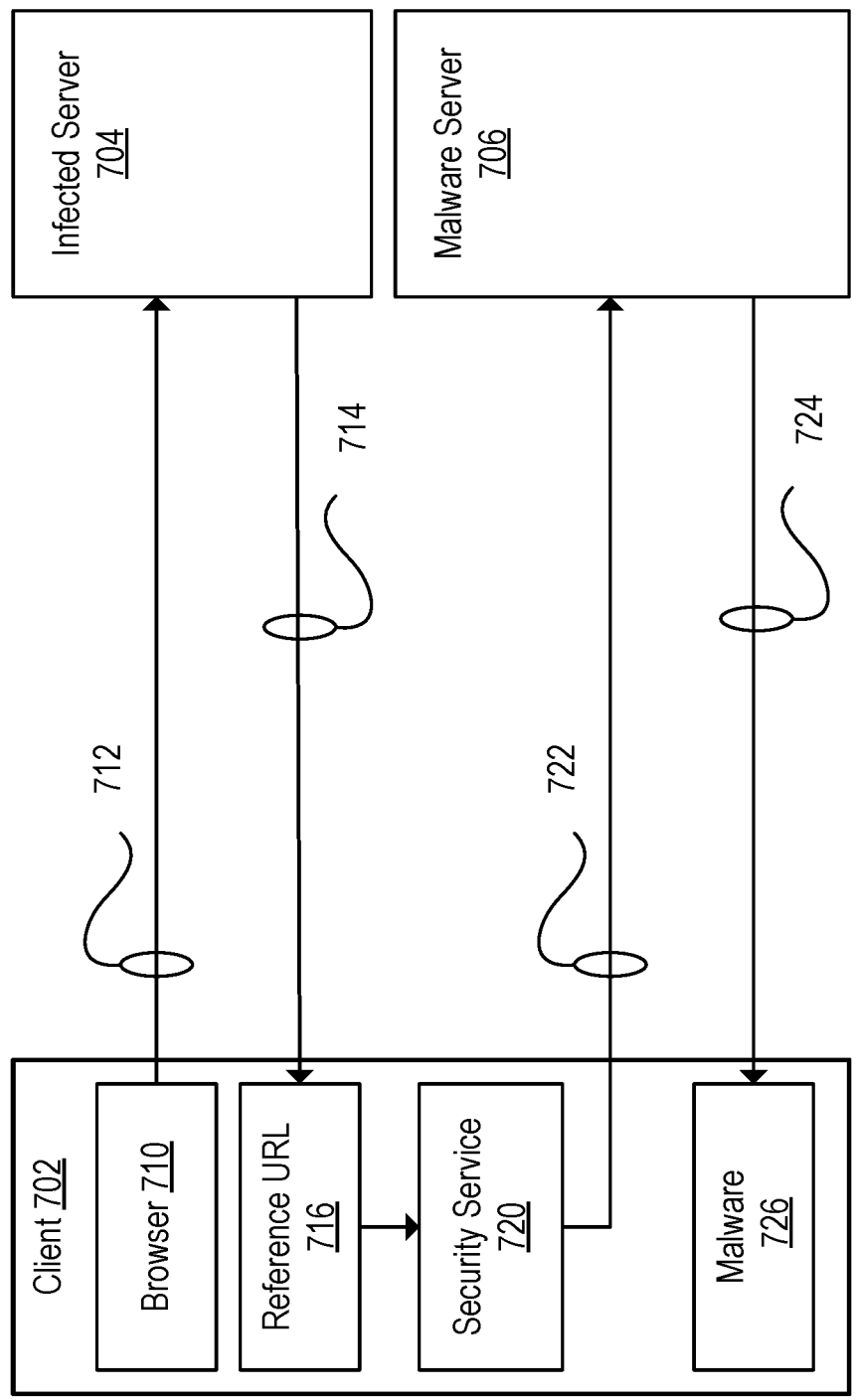
FIG. 7 is a block diagram illustrating a client device interacting with compromised servers in accordance with disclosed embodiments.

FIG. 7 is a block diagram illustrating a client device interacting with compromised servers in accordance with disclosed embodiments. In one embodiment, browser 710 operates on client 702. Browser 710 can be directed to send out request 712 (e.g., HTTP, SMTP, etc.), the request directed to a compromised or infected server 704. In one example, infected server 704 is hosted by a known and/or trusted domain (e.g., the domain has a good reputation). In response to request 712, Infected server 704 sends response 714 to client 702, where the response includes reference URL 716 which directs to malware server 706. The request 722 directed to malware server 706 can result in response 724 returning malware 726 to client 702.

In the embodiment depicted in FIG. 7, security service 720 can intercept request 722 to malware server 706 as request 722 leaves client 702, where the request may have been initiated by a user clicking on reference URL 716. In another embodiment, security service 720 can be external to client 702 and intercepts response 714 when it is sent by infected server 704 before it reaches client 702. In one embodiment, security service 720 is an example of security service 124, depicted in FIG. 1. When security service 720 detects and/or blocks traffic to reference URL 716, security service 720 can blacklist malware server 706. Subsequently, because the reference URL 716 to malware server 706 can be detected and blacklisted, new domains can be created as replacements.

Figure 8:
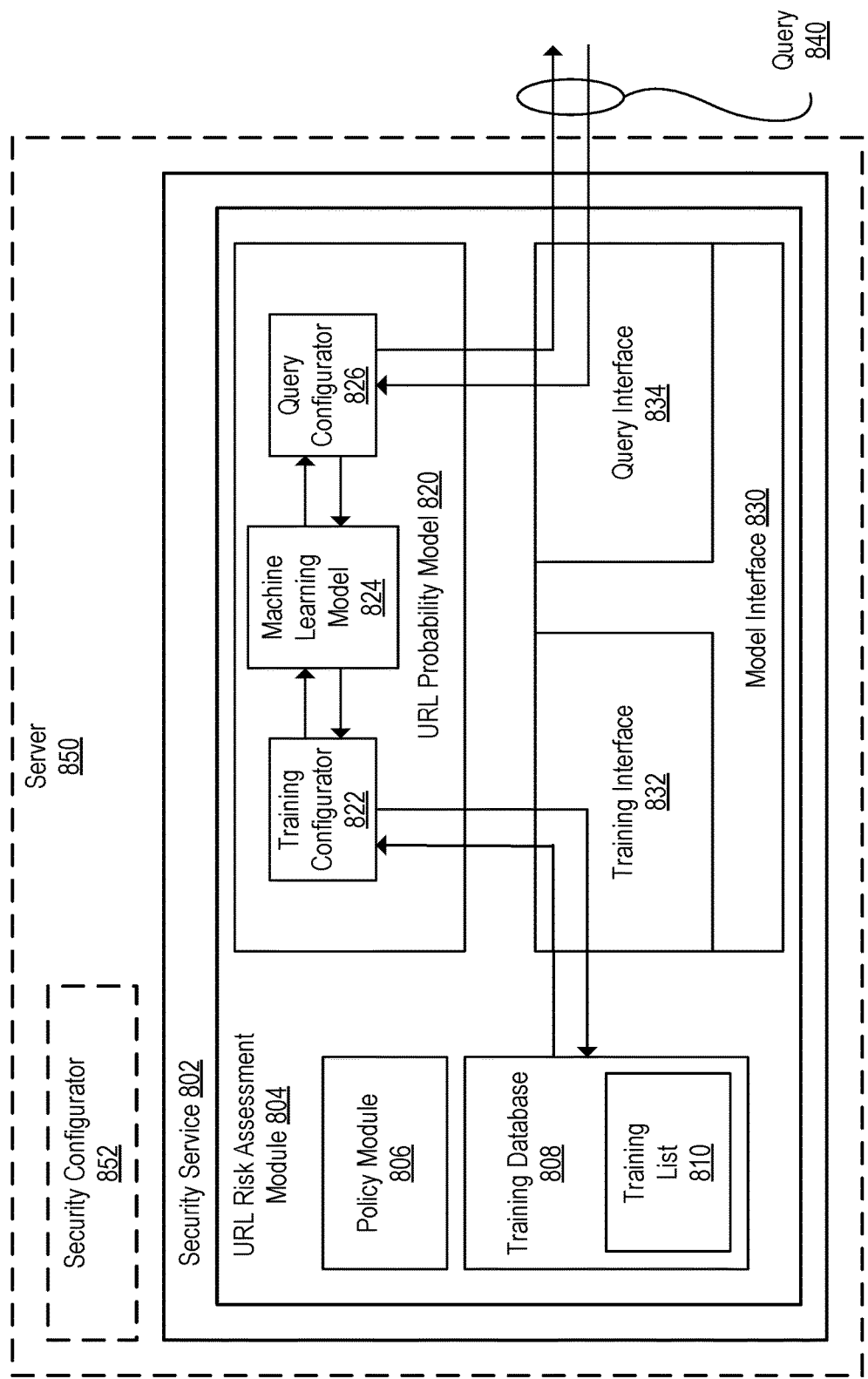
FIG. 8 is a block diagram illustrating a security service with a URL risk assessment module for analyzing URLs in accordance with disclosed embodiments.

FIG. 8 is a block diagram illustrating a security service with a URL risk assessment module for analyzing URLs in accordance with disclosed embodiments. FIG. 8 includes security service 802 that includes URL risk assessment module 804. In one embodiment, security service 802 is an example of security service 124, depicted in FIG. 1. In some embodiments, security service 802 operates on server 850. Server 850 includes security configurator 852. In one embodiment, security configurator 852 instructs server 850 to perform the embodiments described below.

URL risk assessment module 804 determines whether a received URL is likely randomly generated, and thus have a higher likelihood of leading to a security threat, or an established or trusted URL. As depicted in FIG. 2, URL risk assessment module 804 includes policy module 806, training database 808, URL probability model 820, and model interface 830. URL probability model 820 includes machine learning model 824 and training configurator 822 and query configurator 826. Model interface 830 includes training interface 832 that allows for training interactions with URL probability model 820 and query interface 834 that allows for post-training queries to be handled by URL probability model 820.

In one embodiment, machine learning model 824 is a neural network (e.g., a long short-term memory [LSTM] model). One example is a Keras LSTM model. Such a model can be implemented to provide sequential analysis wherein trained input sequences are used to establish the likelihoods of transitions between different sequential sequence segments. After training, a test sequence may be applied to the trained model wherein the model describes the probability of each segment-segment transition as the segments of the test sequence are sequentially applied. The manner in which sequences are broken into segments may be per-character or according to some other method.

Policy module 806 determines which (if not all) of the elements within training database 808 are to be used to train machine learning model 824. Policy module 806 also determines when and how frequently such training occurs, what sources of data may be used to supplement training database 808, and the scores and weights to be applied to later uses of the model (such as threshold 907 used by comparator 1144 in FIG. 11). In one embodiment, policy module 806 acts based on instructions from security configurator 852.

URL risk assessment module 804 sends training list 810 from training database 808 to training configurator 822 in URL probability model 820 via training interface 832. Training configurator 822 performs a process on the URLs in training list 810. In one embodiment, training configurator 822 normalizes and segments URLs from training list 810 prior to sending them to machine learning model 824. As the number of training URLs sent through training interface 832 increases, machine learning model 824 becomes more accurate in predicting whether a URL is legitimate or suspicious and potentially dangerous. Subsequently, when a URL is received, the URL can be sent as query 840 to URL probability model 820 via query interface 834. Query configurator 826 is programmed to perform a process on the received URL. In one embodiment, query configurator 826 normalizes and segments URLs from query 840 prior to sending them to machine learning model 824. Machine learning model 824 returns a response to query 840 indicating whether machine learning model 824 determined the URL from query 840 to be a risky URL or not a risky URL.

Figure 9:
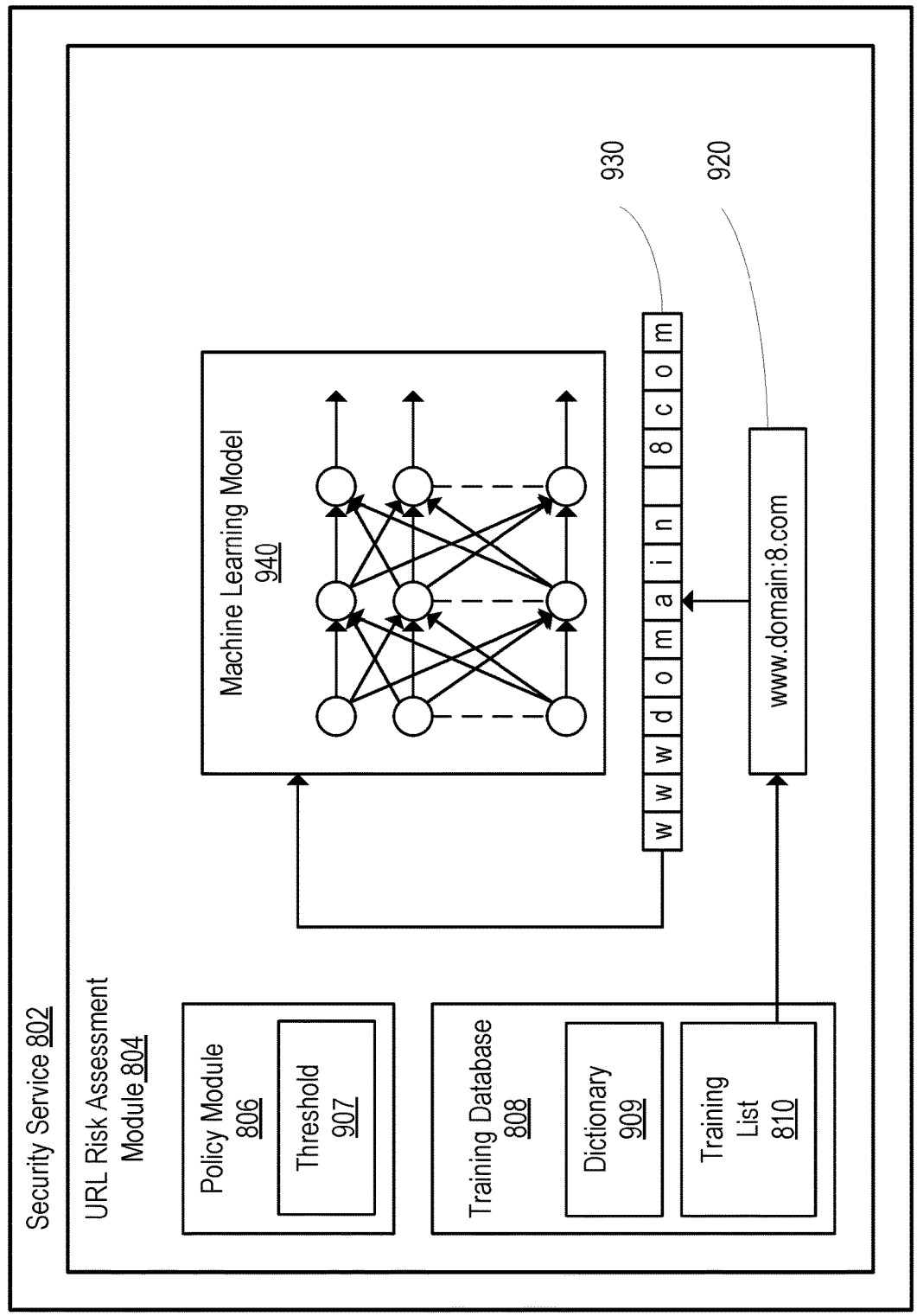
FIG. 9 is a block diagram illustrating training a URL probability model for analyzing URLs in accordance with disclosed embodiments.

FIG. 9 is a block diagram illustrating training a URL probability model for analyzing URLs in accordance with disclosed embodiments. FIG. 9 is a training-focused view of URL risk assessment module 804 in security service 802 from FIG. 8. In FIG. 9, policy module 806 includes threshold 907, and training database 808 includes dictionary 909 in addition to training list 810 described previously.

Dictionary 909 defines how the training database 808 maps the elements of a URL into a list of segments that are to be included in a domain sent to machine learning model 940. In one embodiment, and as shown in FIG. 9, each character (e.g., letters and numbers) of the URL is a separate segment. For example, each character of a URL can be a separate segment, excluding the "." between portions of the URL. Dictionary 909 can also define what to use in place of the excluded segments of the URL, e.g., a space, no space, etc. Given the example URL: "www.domain:8.com" 920, because dictionary 909 does not include "." and ":", the URL segments 930 that results is "wwwdomain 8com", where each character is a separate segment.

As depicted in FIG. 9, each segment is an individual character of the URL. In other embodiments, a segment can be multiple characters (e.g., every two characters) or separate portions of a URL (e.g., a first segment is "www", a second segment is "com", and a third segment is the characters in between). In another embodiment, the segments can exclude the "www" and/or the "com" portions of the URL.

Segments can also be overlapping. For example, using the example of FIG. 9, a first segment can be "wwwdomain 8" and a second segment is "domain 8com". URL segments 930 may also be functions of URL portions. In one embodiment, URL segments 930 may use a function to reduce all numeric segments to a single segment, reduce common segments (e.g., "www", "com", etc.) to a single segment or similarly reduce particular sequences of segments into a single segment. For example, the single segment value "domains" can be used to represent common internet domains (e.g., ".com," ".org," ".net," etc.). Such a reduced single segment value would preferably be one not normally seen in training list 810.

URL segments 930 can then be sent serially into machine learning model 940 to train machine learning model 940. In one embodiment, machine learning model 940 is an LSTM recurrent neural network configured to handle sequence classification. The application of training list 810 (via training interface 832 and managed by training configurator 822 of FIG. 8) trains machine learning model 940 on the prevalence of transitions between segments, e.g., determining how likely is it that based on the sequence of previous segments, the next segment is "X", where "X" is a variable. In other words, machine learning model 940 is learning the probability, at any point in a sequence of segments and given the previous segments, what the likelihood of the URL being risky or not risky based on the value of the next segment. For example, if machine learning model 940 is sent segments of a URL of a "w" followed by a "w", machine learning model 940 could determine that this is highly indicative of a risk-free or low risk URL. Conversely, if machine learning model 940 is sent segments of a URL of a "8" followed by a "z", machine learning model 940 could determine that this is highly indicative of a risky or suspicious URL as the segment-segment "8z" is unlikely to appear in most common URLs in training database 808. In such embodiments, machine learning model 940 may determine that the URL is risky because it exhibits indications of being dynamically and/or randomly generated, which can indicate a URL generated for malicious purposes. The relationship between the risk associated with an individual transition and the risk associated with a URL as a whole will be discussed subsequently.

The choice of architecture and configuration for machine learning model 940 will be understood by those of ordinary skill in the art to depend on, upon other factors, the type of segmentation used, whether segment overlap is allowed and the quality and quantity of training material in training database 808. Certain architectures are more easily adapted to support constant updates whereas other architecture may be optimized for performance. The example shown herein utilizes a Keras LSTM using the python programming language but one of ordinary skill in the art may practice the invention using any model and architecture capable of sequence analysis.

FIGS. 10A-B is an example python script for configuring a URL probability model in accordance with an embodiment. Lines 1-12 import various packages (i.e. libraries) including the Keras model at lines 2 and 5-8. At lines 14-15, the training files and paths are configured. At line 17, a numerical mapping for characters in the model is loaded. At line 18, unknown characters are mapped to a space character. At line 19, the window size, the number of characters considered while training the model, is set. At line 20, the number of characters on which the model operates, the vocabulary size, is set. At lines 22-25, a sequential model with an LSTM layer and Dense layer is created and compiled after defining a loss function, optimizer and evaluation metric. At lines 27-33, each file is opened and prepared for reading into the model. At lines 35-37, the file contents are collected. At lines 39-40, a mapping of those characters present in the file is created. At lines 42-51, the "sequences" variable is updated with the encoded mapping of each character of each line. At lines 55-60, the array of sequences "X" is created and fed into the model at line 62. At lines 64-71, the model is saved for use in a lookup.

Figure 11:
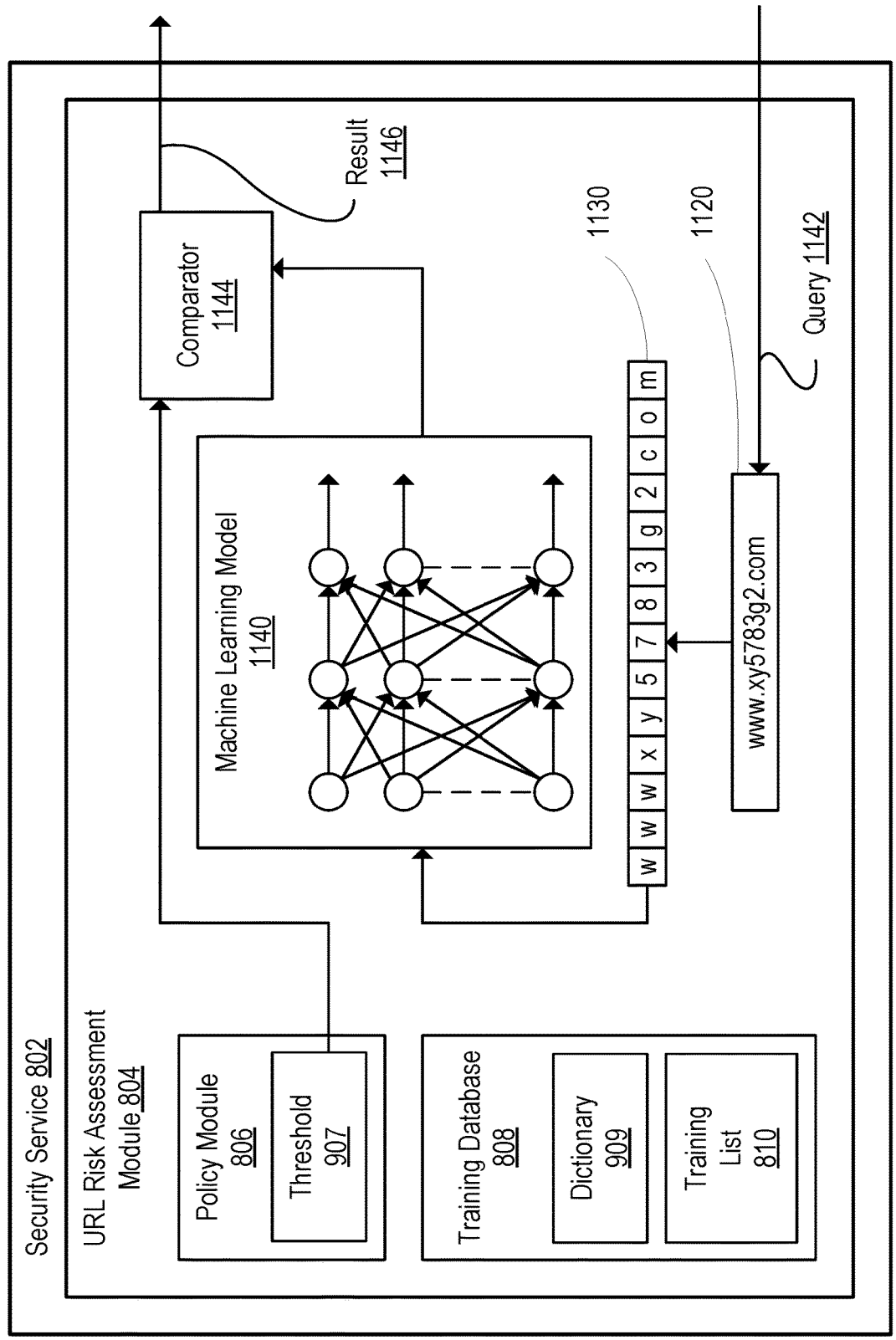
FIG. 11 is a block diagram illustrating querying a URL probability model for analyzing URLs in accordance with disclosed embodiments.

FIG. 11 is a block diagram illustrating querying a URL probability model for analyzing URLs in accordance with disclosed embodiments. FIG. 11 is a query-focused view of URL risk assessment module 804 in security service 802 from FIG. 8. In FIG. 11, policy module 806 includes threshold 907, and training database 808 includes dictionary 909 in addition to training list 810 described previously.

In FIG. 11, after machine learning model 1140 has been trained using training list 810 (as described in FIGS. 9 and 10), URL risk assessment module 804 receives query 1142.

In some embodiments, security service 802 receives query 1142 from a client device (e.g., client 702 in FIG. 7) hosting security service 802 or by intercepting network traffic between the client device and a server. In one embodiment, URL risk assessment module 804 receives query 1142 via a query interface that directs the query to machine learning model 1140. Query 1142 includes URL 1120, where URL 1120 is "www.xy5783g2.com". Similar to FIG. 9, dictionary 909 defines how the elements of URL 1120 are mapped into a list of segments that are to be included in a domain sent to machine learning model 940. Given URL 1120: "www.xy5783g2.com", because dictionary 909 does not include ".", the URL segments 1130 that results is: "wwwxy5783g2com", where each character is a separate segment. URL segments 1130 can then be sent serially into machine learning model 1140 to as part of generating a response to query 1142.

In one embodiment, machine learning model 1140 returns an output after each segment is serially processed by machine learning model 1140, where each output uses the knowledge of previous segments to determine how risky or not risky URL 1120 is. The multiple outputs can be summed, multiplied, and scaled to get a final output that is sent to comparator 1144. Threshold 907 is also directed to comparator 1144 and compared to the final output from machine learning model 1140 to generate result 1146 which indicates whether the URL in query 1142 is risky or not risky. In one embodiment, a probability value for a URL above the threshold value is indicative of high risk URL and a probability value for a URL below the threshold value is indicative of low risk URL. For example, a probability value for a URL being above the threshold value can be an indication that the URL was randomly generated. In other embodiments, a probability value for a URL below the threshold value is indicative of high risk URL and a probability value for a URL above the threshold value is indicative of low risk URL.

In one embodiment, the value compared against threshold 907 by comparator 1144 is a function of the outputs of machine learning model 1140 over time. In one example, the outputs of each segment-segment evaluation may be added together and divided by the total number of outputs to create an average value. In another example, the outputs of machine learning model 1140 are multiplied together and scaled by the number of segment-segment evaluations. In another example, the outputs of machine learning model 1140 are weighted before combination (e.g., earlier evaluations have higher impact).

FIGS. 12A-B is an example python script for configuring a URL probability model in accordance with an embodiment. At lines 6-20, the function "generate_seq" is defined to generate a sequence based on the saved mapping, remove unknown characters by substitution and padding with required zeros. At lines 22-23 the saved model and mapping are loaded. At lines 25-41, the function "get_score" is defined to loop through the characters of the test URL (line 28) and generate a score "sc" for each character transition. The final score "p" is returned (line 41) based on dividing the number of times the prediction matched (lines 35-36) by the total characters "l". Lines 51-56 show example usage of the functions.

Figure 13:
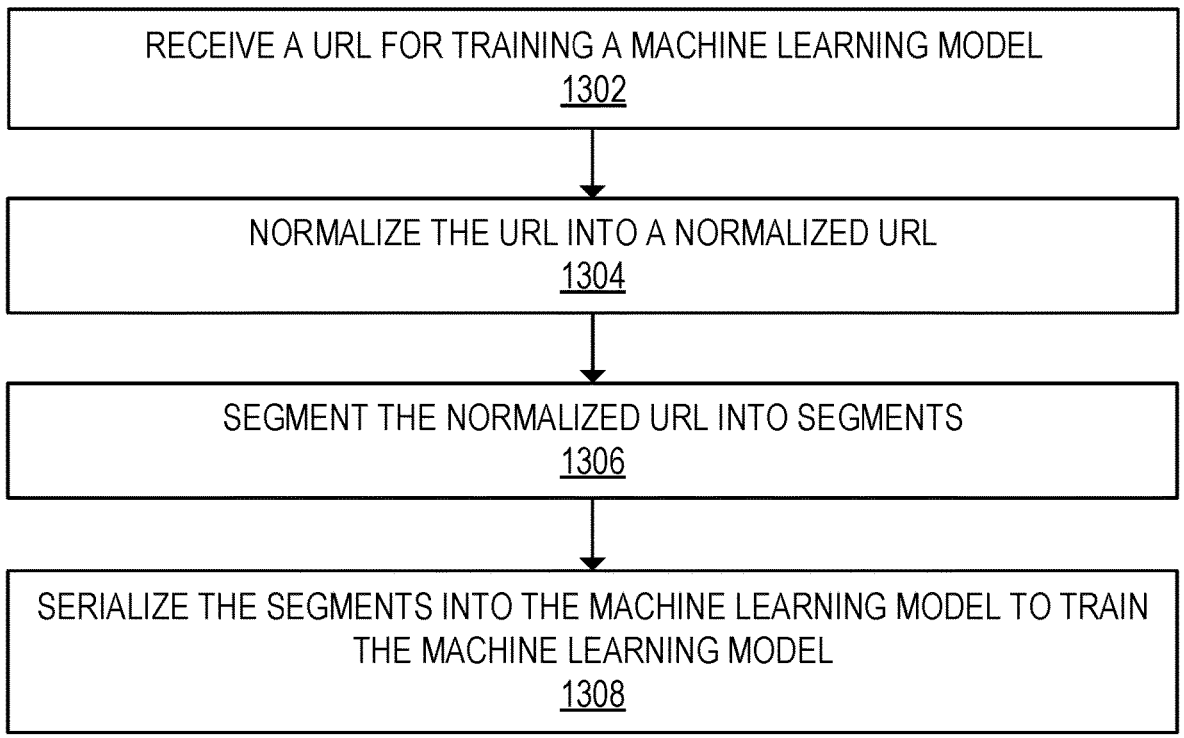
FIG. 13 is a flow diagram illustrating a process for training a machine learning model using a training list of URLs in accordance with an embodiment.

FIG. 13 is a flow diagram illustrating a process for training a machine learning model using a training list of URLs in accordance with an embodiment. For ease of understanding, the description of FIG. 13 below references components of the networked environments of FIGS. 1, 8 and 9, however, it is not limited to those components. In one embodiment, a security configurator (e.g., security configurator 852 in FIG. 8) instructs a security service (e.g., security server 802) to perform the actions described below. In one embodiment, security service 802 is an example of security service 124, depicted in FIG. 1. In other embodiments, a management microservice (e.g., microservice 108-122) receives instructions to perform the actions described below. Further, the actions below may be performed by one or more security microservices at the direction of a management microservice. As such, a single security microservice may perform an action, or two more security services may perform the action either independently, or in conjunction. Although FIG. 13 describes operations performed by a management microservice, some or all of the operations described in FIG. 13 can be performed by a configuration microservice, another type of microservice, an application, or any other computer-executable logic.

At block 1302, a training configurator (e.g., training configurator 822 in FIG. 8) receives at least one URL from a training list (e.g., training list 810) for training the machine learning model (e.g., machine learning model 824). In one embodiment, training configurator 822 receives the at least one URL from training list 810 via training interface 832. The training list 810 can contain known URLs that have previously been determined to be non-risky and/or exhibit qualities of non-risky URLs.

At block 1304, training configurator 822 normalizes the at least one URL into a normalized URL. Normalizing the URL can include applying dictionary 909 to resolve character restrictions, e.g., determine which characters of the URL will be sent to machine learning model 824 and which characters of the URL will not be sent to machine learning model 824. For example, training configurator 822 can omit some "periods" in a URL (e.g., the period after "www" and before the top-level domain). In other embodiments, normalizing the URL can also include flattening all numbers in the URL to a single "numbers" character, tokenizing the elements of the URL, and rearranging/reversing the URL. For example, given a URL "www.website.com," normalizing the URL can result in: "com.website.www" or "wwwwebsitecom."

At block 1306, training configurator 822 segments the normalized URL into segments. In one embodiment, the segments are non-overlapping character(s) of the normalized URL. Continuing the example above, each individual character of "wwwwebsitecom" can be recognized as a separate segment. In another example, where character overlapping is permitted, "wwwwebsite" and "websitecom" can be recognized as individual segments.

At block 1308, training configurator 822 serializes the segments into machine learning model 824 (e.g., passes the segments of each URL in order and one at a time) to train machine learning model 824. The machine learning model 824 is configured to determine an indication of risk associated with one or more segments of the URL or an indication of risk associated with the URL based on the indications of risk for each of the one or more segments of the URL. Training configurator 822 sends each segment of the normalized URL into machine learning model 824 to improve the ability of machine learning model 824 to distinguish risky URLs from non-risky URLS. For example, the result of applying the segments to machine learning model 824 is to train the model to recognize segment-segment transitions that are indicative of common-used and/or non-risky URLs. As training configurator 822 sends more URLs to machine learning model 824, the ability for machine learning model 824 to improve its ability to distinguish risky URLs from non-risky URLs is enhanced. The more training data from non-risky URLs is provided to machine learning model 824, the better the ability to differentiate between risky and non-risky URLs. In one embodiment, the suitability of machine learning model 824 to provide dependable predictions is dependent on the quality and quantity of the training material in training list 810.

Figure 14:
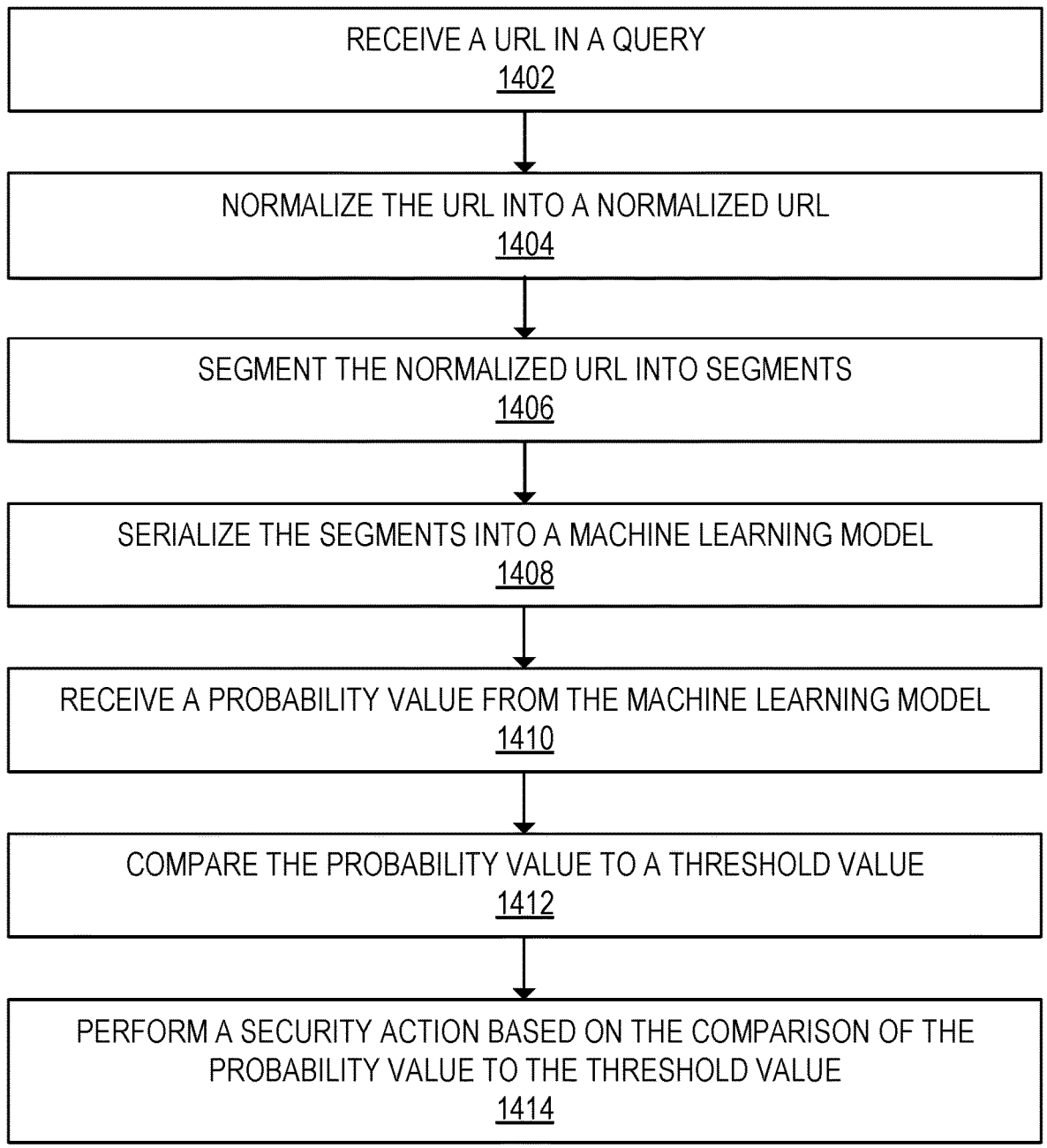
FIG. 14 is a flow diagram illustrating a process for querying a machine learning model to determine a probability that a URL is risky in accordance with an embodiment.

FIG. 14 is a flow diagram illustrating a process for querying a machine learning model to determine a probability that a URL is risky in accordance with an embodiment. For ease of understanding, the description of FIG. 14 below references components of the networked environments of FIGS. 1, 8 and 11, however, it is not limited to those components. In one embodiment, a security configurator instructs a security service (e.g., security server 802) to perform the actions described below. In one embodiment, security service 802 is an example of security service 124, depicted in FIG. 1. In other embodiments, a management microservice (e.g., microservice 108-122) receives instructions to perform the actions described below. Further, the actions below may be performed by one or more security microservices at the direction of a management microservice. As such, a single security microservice may perform an action, or two more security services may perform the action either independently, or in conjunction. Although FIG. 13 describes operations performed by a management microservice, some or all of the operations described in FIG. 13 can be performed by a configuration microservice, another type of microservice, an application, or any other computer-executable logic.

At block 1402, a query configurator (e.g., query configurator 826 in FIG. 8) receives at least one URL for in a query directed to a machine learning model (e.g., machine learning model 824). The at least one URL can be received from a client device or by intercepting network traffic sent from a server to the client device (e.g., as part of an HTTP request/response process). In one embodiment, the query is received by query configurator 826 via query interface 834.

At block 1404, query configurator 826 normalizes the at least one URL into a normalized URL, as described previously in block 1304 of FIG. 13.

At block 1406, query configurator 826 segments the normalized URL into segments, as described previously in block 1306 of FIG. 13.

At block 1408, query configurator 826 serializes the segments into machine learning model 824, as described previously in block 1308 of FIG. 13. In one embodiment, having been trained using URLs from training list 810 (as described in FIG. 13), machine learning model 824 generates probability values for URLs received via query configurator 826. For example, after machine learning model 824 receives each segment of the normalized URL, machine learning model 824 can provide a probability value for the segment-segment transition, where the probability value is indicative of a determined likelihood of the segment-segment transition being found in a non-risky URL, such as those used to train machine learning model 824.

At block 1410, query configurator 826 receives at least one probability value for the URL from machine learning model 824. In one embodiment, the probability value is a single result returned by machine learning model 824 and indicates a risk level for the URL that was presented to machine learning model 824. In another embodiment, the probability value is a combination of a plurality of probability values provided by machine learning model 824, where each of the plurality of probability values was generated after each segment was serially provided to the machine learning model 824. In another embodiment, machine learning model 824 provide multiple probability values based on each segment-segment analysis.

At block 1412, query configurator 826 compares the probability value to a threshold value. In one embodiment, the threshold value is determined based on a security policy.

At block 1414, query configurator 826 is programmed to perform, or send instructions to security service 802 to perform, a security action based on the comparison. Security actions can include blacklisting the URL, allowing the client device to access the URL and flagging the URL for further analysis, changing the contents of training database 808, auditing security logs or adjusting the security policy of security services. In one embodiment, the threshold value is dynamic and the security action includes making an adjustment to the threshold value based on the results of one or more previous URL queries to machine learning model 824. For example, if the results from machine learning model 824 for a sequential series of three URLs associated with a same client show that the three URLs are risky, the threshold value can be adjusted to a higher value to strengthen the security for the client. In other examples, the machine learning model 824 determining a single URL has indications of risk can result in modifying the threshold value. In some embodiment, the adjustment may be made by policy module 806, URL risk assessment module 804, or security service 802 responsive to configuration settings, the results of real-time operation (e.g., receiving too many false positives in a given timeframe), user or administrator input, or similar means.

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 15:
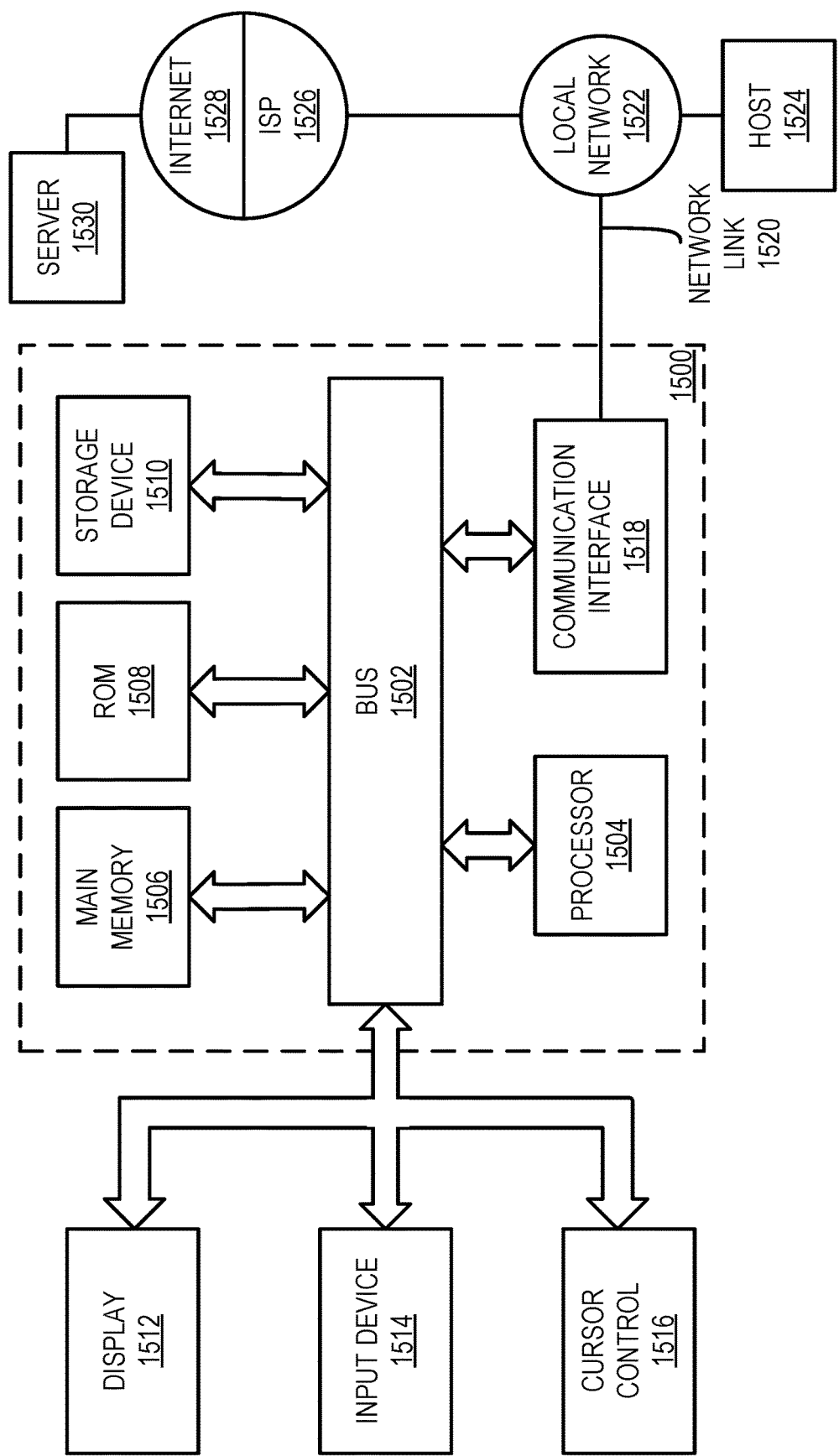
FIG. 15 is a block diagram that illustrates a computer system utilized in implementing the above-described techniques in accordance with some of the disclosed embodiments.

FIG. 15 is a block diagram that illustrates a computer system 1500 utilized in implementing the above-described techniques in accordance with some of the disclosed embodiments. Computer system 1500 may be, for example, a desktop computing device, laptop computing device, tablet, smartphone, server appliance, computing mainframe, multimedia device, handheld device, networking apparatus, or any other suitable device.

Computer system 1500 includes one or more buses 1502 or other communication mechanism for communicating information, and one or more hardware processors 1504 coupled with buses 1502 for processing information. Hardware processors 1504 may be, for example, general purpose microprocessors. Buses 1502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1500 also includes a main memory 1506, such as a random-access memory (RAM) or other dynamic or volatile storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 a special-purpose machine that is customized to perform the operations specified in the instructions.

Computer system 1500 further includes one or more read only memories (ROM) 1508 or other static storage devices coupled to bus 1502 for storing static information and instructions for processor 1504. One or more storage devices 1510, such as a solid-state drive (SSD), magnetic disk, optical disk, or other suitable non-volatile storage device, is provided and coupled to bus 1502 for storing information and instructions.

Computer system 1500 may be coupled via bus 1502 to one or more displays 1512 for presenting information to a computer user. For instance, computer system 1500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1512 may include, without limitation, plasma display devices, projectors, cathode ray tube (CRT) monitors, electronic paper, virtual reality headsets, braille terminal, and/or any other suitable device for outputting information to a computer user. In one embodiment, any suitable type of output device, such as, for instance, an audio speaker or printer, may be utilized instead of a display 1512.

One or more input devices 1514 are coupled to bus 1502 for communicating information and command selections to processor 1504. One example of an input device 1514 is a keyboard, including alphanumeric and other keys. Another type of user input device 1514 is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. Yet other examples of suitable input devices 1514 include a touch-screen panel affixed to a display 1512, cameras, microphones, accelerometers, motion detectors, and/or other sensors. In one embodiment, a network-based input device 1514 may be utilized. In such an embodiment, user input and/or other information or commands may be relayed via routers and/or switches on a Local Area Network (LAN) or other suitable shared network, or via a peer-to-peer network, from the input device 1514 to a network link 1520 on the computer system 1500.

A computer system 1500 may implement techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510.

Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1500 can receive the data on the network and demodulate the signal to decode the transmitted instructions. Appropriate circuitry can then place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

A computer system 1500 may also include, in one embodiment, one or more communication interfaces 1518 coupled to bus 1502. A communication interface 1518 provides a data communication coupling, typically two-way, to a network link 1520 that is connected to a local network 1522. For example, a communication interface 1518 may be an integrated services digital network (ISDN) card, cable modem, satellite modem, or a modem to provide a data communication connection to a corresponding type of telephone line. As another example, the one or more communication interfaces 1518 may include a local area network (LAN) card to provide a data communication connection to a compatible LAN. As another example, the one or more communication interfaces 1518 may include a wireless network interface controller, such as an 802.11-based controller, Bluetooth controller, Long Term Evolution (LTE) modem, and/or other types of wireless interfaces. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by a Service Provider (e.g., ISP 1526). Service Provider 1526, which may for example be an Internet Service Provider (ISP), in turn provides data communication services through a wide area network, such as the world-wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

In one embodiment, computer system 1500 can send messages and receive data, including program code and/or other types of instructions, through the network(s), network link 1520, and communication interface 1518. In the Internet example, a server 1530 might transmit a requested code for an application program through Internet 1528, ISP 1526, local network 1522 and communication interface 1518. The received code may be executed by processor 1504 as it is received, and/or stored in storage device 1510, or other non-volatile storage for later execution. As another example, information received via a network link 1520 may be interpreted and/or processed by a software component of the computer system 1500, such as a web browser, application, or server, which in turn issues instructions based thereon to a processor 1504, possibly via an operating system and/or other intermediate layers of software components.

In one embodiment, some or all of the systems described herein may be or comprise server computer systems, including one or more computer systems 1500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In one embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In one embodiment, the cloud-based components may be implemented by third-party entities, on behalf of another entity for whom the components are deployed. In other embodiments, however, the described systems may be implemented entirely by computer systems owned and operated by a single entity.

In one embodiment, an apparatus comprises a processor and is configured to perform any of the foregoing methods. In one embodiment, a non-transitory computer-readable storage medium, storing software instructions, which when executed by one or more processors cause performance of any of the foregoing methods.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in computer-executable instructions. The instructions can be used to cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program circuits to perform at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Examples of embodiments of methods, apparatuses, systems, etc. detailed herein are listed below.

In some embodiments, a computer-implemented method comprises: receiving a URL in a query and normalizing the URL into a normalized URL. The method further comprises segmenting the normalized URL into a plurality of segments and serially providing each of the plurality of segments into a machine learning model trained to provide an indication of risk associated with the URL. The method further comprises receiving at least one probability value from the machine learning model, comparing the probability value to a threshold value, and performing a security action based on a result of comparing the probability value to the threshold value.

In some embodiments, one or more of the following applies: 1) serially providing each of the plurality of segments into the machine learning model includes the machine learning model performing time-series predictions of the plurality of segments of the normalized URL; 2) the threshold value is determined based on a security policy; 3) the method further comprises: modifying the threshold value in response to probability values of one or more URLs being above the threshold value; 4) the probability value being above the threshold value is indicative of the URL being randomly-generated; and 5) serially providing each of the plurality of segments into the machine learning model includes sending each of the plurality of segments to the machine learning model.

In some embodiments, one or more non-transitory computer-readable storage media store instructions which, when executed by one or more hardware processors, cause performance of a method comprising: receiving a URL in a query and normalizing the URL into a normalized URL. The method further comprises segmenting the normalized URL into a plurality of segments and serially providing each of the plurality of segments into a machine learning model trained to provide an indication of risk associated with the URL. The method further comprises receiving at least one probability value from the machine learning model, comparing the probability value to a threshold value, and performing a security action based on a result of comparing the probability value to the threshold value.

In some embodiments, one or more of the following applies: 1) serially providing each of the plurality of segments into the machine learning model includes the machine learning model performing time-series predictions of the plurality of segments of the normalized URL; 2) the threshold value is determined based on a security policy; 3) the method further comprises: modifying the threshold value in response to probability values of one or more URLs being above the threshold value; 4) the probability value being above the threshold value is indicative of the URL being randomly-generated; and 5) serially providing each of the plurality of segments into the machine learning model includes sending each of the plurality of segments to the machine learning model.

In some embodiments, an apparatus comprises: one or more hardware processors; and memory coupled to the one or more hardware processors, the memory storing instructions which, when executed by the one or more hardware processors, cause the apparatus to: receive a URL in a query and normalize the URL into a normalized URL. The instructions further cause the apparatus to segment the normalized URL into a plurality of segments and serially provide each of the plurality of segments into a machine learning model trained to provide an indication of risk associated with the URL. The instructions further cause the apparatus to receive at least one probability value from the machine learning model, compare the probability value to a threshold value, and perform a security action based on a result of comparing the probability value to the threshold value.

In some embodiments, one or more of the following applies: 1) serially providing each of the plurality of segments into the machine learning model includes the machine learning model performing time-series predictions of the plurality of segments of the normalized URL; 2) the threshold value is determined based on a security policy; 3) the instructions further cause the apparatus to modify the threshold value in response to probability values of one or more URLs being above the threshold value; 4) the probability value being above the threshold value is indicative of the URL being randomly-generated; and 5) serially providing each of the plurality of segments into the machine learning model includes sending each of the plurality of segments to the machine learning model.

In some embodiments, a computer-implemented method comprises: receiving a URL from a training database containing a plurality of URLs to train a machine learning model. The method further comprises normalizing the URL into a normalized URL and segmenting the normalized URL into a plurality of segments. The method further comprises serially providing each of the plurality of segments into the machine learning model, the machine learning model determining an indication of risk associated with each of the plurality of segments.

In some embodiments, one or more of the following applies: 1) normalizing the URL into the normalized URL comprises: applying character restrictions to the URL to remove restricted characters; and 2) normalizing the URL into the normalized URL comprises: rearranging portions of the URL.

In some embodiments, one or more non-transitory computer-readable storage media store instructions which, when executed by one or more hardware processors, cause performance of a method comprising: receiving a URL from a training database containing a plurality of URLs to train a machine learning model. The method further comprises normalizing the URL into a normalized URL and segmenting the normalized URL into a plurality of segments. The method further comprises serially providing each of the plurality of segments into the machine learning model, the machine learning model determining an indication of risk associated with each of the plurality of segments.

In some embodiments, one or more of the following applies: 1) normalizing the URL into the normalized URL comprises: applying character restrictions to the URL to remove restricted characters; and 2) normalizing the URL into the normalized URL comprises: rearranging portions of the URL.

In some embodiments, an apparatus comprises: one or more hardware processors; and memory coupled to the one or more hardware processors, the memory storing instructions which, when executed by the one or more hardware processors, cause the apparatus to: receive a URL from a training database containing a plurality of URLs to train a machine learning model. The instructions further cause the apparatus to normalize the URL into a normalized URL and segment the normalized URL into a plurality of segments. The instructions further cause the apparatus to serially provide each of the plurality of segments into the machine learning model, the machine learning model determining an indication of risk associated with each of the plurality of segments.

In some embodiments, one or more of the following applies: 1) normalizing the URL into the normalized URL comprises: applying character restrictions to the URL to remove restricted characters; and 2) normalizing the URL into the normalized URL comprises: rearranging portions of the URL.

What is claimed is:

1. A computer-implemented method comprising:
receiving a URL in a query;
normalizing the URL into a normalized URL;
segmenting the normalized URL into a plurality of segments;
serially providing each of the plurality of segments into a machine learning model trained to provide an indication of risk associated with the URL;
receiving at least one probability value from the machine learning model;
comparing the probability value to a threshold value; and
performing a security action based on a result of comparing the probability value to the threshold value.

2. The computer-implemented method of claim 1, wherein serially providing each of the plurality of segments into the machine learning model includes the machine learning model performing time-series predictions of the plurality of segments of the normalized URL.

3. The computer-implemented method of claim 1, wherein the threshold value is determined based on a security policy.

4. The computer-implemented method of claim 1, further comprising:
modifying the threshold value in response to probability values of one or more URLs being above the threshold value.

5. The computer-implemented method of claim 1, wherein the probability value being above the threshold value is indicative of the URL being randomly-generated.

6. The computer-implemented method of claim 1, wherein serially providing each of the plurality of segments into the machine learning model includes sending each of the plurality of segments to the machine learning model.

7. One or more non-transitory computer-readable storage media storing instructions which, when executed by one or more hardware processors, cause performance of a method comprising:
receiving a URL in a query;
normalizing the URL into a normalized URL;
segmenting the normalized URL into a plurality of segments;
serially providing each of the plurality of segments into a machine learning model trained to provide an indication of risk associated with the URL;
receiving at least one probability value from the machine learning model;
comparing the probability value to a threshold value; and
performing a security action based on a result of comparing the probability value to the threshold value.

8. The one or more non-transitory computer-readable storage media of claim 7, wherein serially providing each of the plurality of segments into the machine learning model includes the machine learning model performing time-series predictions of the plurality of segments of the normalized URL.

9. The one or more non-transitory computer-readable storage media of claim 7, wherein the threshold value is determined based on a security policy.

10. The one or more non-transitory computer-readable storage media of claim 7, further comprising:
modifying the threshold value in response to probability values of one or more URLs being above the threshold value.

11. The one or more non-transitory computer-readable storage media of claim 7, wherein the probability value being above the threshold value is indicative of the URL being randomly-generated.

12. The one or more non-transitory computer-readable storage media of claim 7, wherein serially providing each of the plurality of segments into the machine learning model includes sending each of the plurality of segments to the machine learning model.

13. An apparatus comprising:
one or more hardware processors;
memory coupled to the one or more hardware processors, the memory storing instructions which, when executed by the one or more hardware processors, causes the apparatus to:
receive a URL in a query;
normalize the URL into a normalized URL;
segment the normalized URL into a plurality of segments;
serially provide each of the plurality of segments into a machine learning model trained to provide an indication of risk associated with the URL;
receive at least one probability value from the machine learning model;
compare the probability value to a threshold value; and perform a security action based on a result of comparing the probability value to the threshold value.

14. A computer-implemented method comprising:
receiving a URL from a training database containing a plurality of URLs to train a machine learning model;
normalizing the URL into a normalized URL;
segmenting the normalized URL into a plurality of segments; and
serially providing each of the plurality of segments into the machine learning model, the machine learning model determining an indication of risk associated with each of the plurality of segments.

15. The computer-implemented method of claim 14, wherein normalizing the URL into the normalized URL comprises:
applying character restrictions to the URL to remove restricted characters.

16. The computer-implemented method of claim 14, wherein normalizing the URL into the normalized URL comprises:
rearranging portions of the URL.

17. One or more non-transitory computer-readable storage media storing instructions which, when executed by one or more hardware processors, cause performance of a method comprising:
receiving a URL from a training database containing a plurality of URLs to train a machine learning model;
normalizing the URL into a normalized URL;
segmenting the normalized URL into a plurality of segments; and
serially providing each of the plurality of segments into the machine learning model, the machine learning model determining an indication of risk associated with each of the plurality of segments.

18. The one or more non-transitory computer-readable storage media of claim 17, wherein normalizing the URL into the normalized URL comprises:
applying character restrictions to the URL to remove restricted characters.

19. The one or more non-transitory computer-readable storage media of claim 17, wherein normalizing the URL into the normalized URL comprises:
rearranging portions of the URL.

20. An apparatus comprising:
one or more hardware processors;
memory coupled to the one or more hardware processors, the memory storing instructions which, when executed by the one or more hardware processors, causes the apparatus to:
receive a URL from a training database containing a plurality of URLs to train a machine learning model;
normalize the URL into a normalized URL;
segment the normalized URL into a plurality of segments; and
serially provide each of the plurality of segments into the machine learning model, the machine learning model determining an indication of risk associated with each of the plurality of segments.

* * * * *